United States Patent
Wurzburger et al.

(10) Patent No.: US 6,254,783 B1
(45) Date of Patent: Jul. 3, 2001

(54) TREATMENT OF CONTAMINATED WASTE WATER

(76) Inventors: Stephen R. Wurzburger, P.O. Box C, Goodyear Bar, CA (US) 95944; James M. Overton, 1127 Nickel La., Yuba City, CA (US) 95911

(*) Notice: Subject to any disclaimer, the term of this patent is extended or adjusted under 35 U.S.C. 154(b) by 0 days.

(21) Appl. No.: 08/701,778

(22) Filed: Aug. 26, 1996

Related U.S. Application Data

(63) Continuation-in-part of application No. 08/613,606, filed on Mar. 11, 1996, now Pat. No. 5,698,107.

(51) Int. Cl.[7] .................................................. C02F 1/52
(52) U.S. Cl. .................... 210/724; 210/695; 210/709; 210/717; 210/726; 210/738; 210/748; 210/912; 205/750
(58) Field of Search .................. 210/695, 702, 210/709, 716, 717, 723, 724, 726, 738, 748, 912; 205/742, 750

(56) References Cited

U.S. PATENT DOCUMENTS

| | | | |
|---|---|---|---|
| 3,901,781 | 8/1975 | Passino | 204/180 |
| 4,006,067 | 2/1977 | Gussack | 204/151 |
| 4,011,151 | 3/1977 | Ito et al. | 204/149 |
| 4,121,991 | 10/1978 | Miller et al. | 204/260 |
| 4,123,339 | 10/1978 | Gale et al. | 204/149 |
| 4,132,632 | 10/1979 | Yu et al. | 208/216 |
| 4,169,035 | * 9/1979 | Stummer et al. | 204/260 |
| 4,193,854 | * 3/1980 | Drnevich et al. | 210/912 |
| 4,338,178 | 7/1982 | Efimov et al. | 204/275 |
| 4,566,975 | 1/1997 | Algulin | 210/711 |
| 4,655,895 | 4/1987 | Feofamov et al. | 204/213 |
| 5,045,214 | 9/1991 | Walker | 210/717 |
| 5,167,777 | * 12/1992 | Kaczur et al. | 210/748 |
| 5,401,420 | * 3/1995 | Siefert et al. | 210/709 |
| 5,423,962 | * 6/1995 | Herbst | 205/742 |
| 5,427,691 | * 6/1995 | Kuyucak et al. | 210/912 |
| 5,443,719 | * 8/1995 | Johnson et al. | 210/199 |

* cited by examiner

Primary Examiner—David A. Simmons
Assistant Examiner—Betsey J. Morrison
(74) Attorney, Agent, or Firm—Robert Samuel Smith

(57) ABSTRACT

A method and apparatus for removing a group of species of metal ions from an aqueous solution to be purified which involves the steps for each species in succession of adjusting the pH of the aqueous solution to a value where hydroxide precipitates of said species in its highest valency state are insoluble, then passing the aqueous solution through an ion state modification cell to raise the valence of the respective species to its highest valency state thus causing the ion specie to form the insoluble hydroxide, then removing the precipitated hydroxide from the aqueous solution by appropriate steps of settling and press filtering. A magnetic field is imposed between the electrodes which improves the efficiency of the ion state modification step.

7 Claims, 3 Drawing Sheets

TREATMENT OF CONTAMINATED WASTE WATER

CROSS REFERENCE TO PRIOR APPLICATIONS

This application is a continuation in part of application Ser. No. 08/613,606 filed Mar. 11, 1996, now U.S. Pat. No. 5,698,107 issued Dec. 16, 1997, for which priority is claimed.

FIELD OF THE INVENTION

This invention relates to a method and process for the removal of contaminants such as heavy or light metals from waste water, particularly such that are discharged from various processing operations and particularly to a method which incorporates magnetic, electrolytic and chemical techniques.

PRIOR ART AND INFORMATION DISCLOSURE

There have been many attempts at the removal of light and heavy metals from aqueous solutions. These attempts include electrowhinning, reverse osmosis, electrophoresis, hydroxide precipitation, radical pH shifting, and direct chemical replacement reaction systems. All of these systems are effective only within very narrow and restrictive process specifications and parameters. The presence of very high large or vey small contaminant levels, the presence of large calcium levels or high pH conditions together with multivalent or multiple contaminants can completely defeat the effectiveness and applicability of the processes.

Techniques disclosed in the patent literature can generally be classified into five groups: electrolytic; hydroxide precipitation; oxidation state modification; low voltage electrolysis high voltage electrolysis.

U.S. Pat. No. 3,901,781 to Passino et al discloses pretreatment of water utilizing ion exchange followed by a dialysis process. Ion exchange resins are expensive and must be periodically reconditioned.

U.S. Pat. No. 4,006,067 to Gussack discloses a process for changing the oxidation state of a dissolved ionic species using porous electrodes. Porous electrodes are subject to degradation by accumulation of scum in pores.

U.S. Pat. No. 4,011,151 to Ho et al discloses a process for purifying water in two steps. In the first step, the electrolysis is effected by dipping an iron anode and a carbon cathode in the waste water, filtering the water, adjusting the pH to 14 by electrolysis with a carbon anode and an aluminum electrode.

U.S. Pat. No. 4,054,516 to Iziumi et al discloses the use of blowing air into the solution to create a foam to carry off precipitates. This approach is not readily adaptable to processing large quantities of water.

U.S. Pat. No. 4,121,991 to Miller et al discloses an electrolytic treatment of water using abrasion of the anode surface with precipitates to clean the electrode surface. This method would be expensive to implement.

U.S. Pat. No. 4,132,622 to Kenny discloses a bi-polar cell having a large surface area.

U.S. Pat. No. 4,123,339 to Gale et al discloses a plurality of closely spaced parallel electrodes. A hydrochloric acid cleaning system is used to keep the iron electrodes free from oxides coating. Removal of the chloride ions requires an additional step.

U.S. Pat. No. 4,338,178 to Vyacheslav et al discloses a nozzle which, together with gas formed on the surface of the electrode carry the sludge away from the electrodes.

U.S. Pat. No. 4,566,975 to Ailgulia discloses hydroxide coprecipitation. This approach requires the additional steps of removing and disposing of the precipitating agent.

U.S. Pat. No. 4,655,895 to Feofanov et al discloses dissolving a metal anode in the presence of a nonsoluble cathode and precipitating nonsoluble inorganic and organic impurities., the electrodes being alternately brought into contact with the air, oxygen and liquor being treated. The patent clearly states that calcium is a problem and requires a preprocessing step not disclosed. A magnetic field is positioned to remove iron particles.

U.S. Pat. No. 4,676,878 to Chez discloses hydrolysis of water using a large field.

U.S. Pat. No. 4,810,344 to Okazaki discloses a plurality of electrolysis vessels, each having an anode and cathode and an electrolysis diaphragm partitioning the space between them with an alkaline water discharge conduit connected to the cathode side and an acidic discharge conduit connected to the anode side of the diaphragm. A magnetic supply unit may be disposed to the vessels to exert a magnetic effect. A diaphragm tends to have a limited life in the field.

U.S. Pat. No. 5,045,214 to Walker discloses coprecipitating non-volatile contaminants with a carrier precipitate formed in situ in the solution. This system is essentially a batch process and requires long treatment times. The primary drawback of this type of system is that, as contaminant levels decrease, the law of "Mass Action" predicts a slowing of the reactions that take place in these batch processes.

For example, the data presented shows a final concentration of Se to be 22 mg/l of water with significantly greater than the levels permitted by the present EPA Water Standard for Se allowance which is 0.05 mg/l.

The processes disclosed in the cited art are not as efficient as the present invention for decontaminating the solutions having the wide range of contaminant concentrations and conditions for which the present invention is targeted nor are they practical for use in reducing pollutant ion concentrations down to the very low levels required for most solution disposal purposes.

In some instances even very low levels of contaminating materials can be a significant problem. Certain metals can cause severe damage to animal life. It is well known that the selenium levels in water entering Kesterson reservoir has had a devastating effect on wildlife living in the wetlands.

The most plentiful ionic species of metallic selenium in aqueous solution is a +4 valent ion, a strong reducing agent that readily combines with oxygen to form $SeO_2$, a colorless solid that is readily soluble in water.

The ineffectiveness of the cited art for dealkalinizing highly concentrated solutions can be explained by considering the nature of hydrolysis.

Hydrolysis of water is the disassociation of the water molecule into ions.
The disassociation is given by:

$$H_2O \text{---} 2H^+ + (OH)^-$$

for "cation" hydrolysis:

$$M^+ + H_2O = M(OH) + H^+$$

and for "anion" hydrolysis, $$X^- + H_2O = HX + (OH)^-$$

While most metals and metalloids will readily form hydrated oxides and hydroxides that, in the presence of a high pH environment, precipitate out of solution, many of these "high pH precipitates" become highly water soluble upon lowering the pH level and, in doing so, recontaminate the treated water solution.

The best known example of ion state modification occurs in electroplating processes where a metal is removed from the anode and enters solution by removing an electron (oxidation) and then deposited on the cathode by combining with an electron supplied by the cathode (reduction). The electroplating process is dramatic illustration of the dependence of the solubility of an atom on the ion state. Ion state modification has been overlooked in the cited art with a consequent limitation on the effectiveness of the processes of the present art such as discussed in the BACKGROUND of this specification.

OBJECTS

Accordingly, it is an object of this invention to remove contaminating heavy and light metal ions from waste water and particularly to provide an efficient process for removing large concentrations of calcium and magnesium such as are found in desert waters in brines created from operations used in processing olives.

It is a particular object of this invention to remove from water impurities such as selenium and arsenic (metallic and non metallic forms) which pose a hazard even when present in small concentrations.

In comparison with prior methods of treatment of spent processing solutions, it is an object that the method and apparatus of the present invention be less complex in terms of required steps and additives required and consequently less costly.

SUMMARY

This invention is directed toward a process of steps including putting the solution through "ion state modification" chambers where ions that would normally and naturally form soluble hydroxides are converted to species that form insoluble hydroxides.

Exemplary steps of the method include:

preparation of a treatment solution containing a high concentration of hydroxyl ions;

mixing the waste water with the treatment fluid preferably in the presence of a magnetic field;

passing the mixture between the electrodes of at least one low voltage ionization state modifying cell wherein a magnetic field is imposed in the cell;

passing the mixture through a clarifier during which step, calcium is removed by settling and filtering;

adding a second solution containing a large concentration of hydroxyl ions preferably in the presence of a magnetic field;

passing the mixture between the electrodes of at least another one high voltage ionization state modifying cell wherein a magnetic field is imposed in the cell;

clarifying the mixture by settling and drawing off magnesium hydroxide.

A significant feature of the invention is the enhancement of the ion state modification step by the imposition of the magnetic field on the solution while it is undergoing treatment between the electrodes of the ion state modification cell. Another significant feature of the invention is the selection of the appropriate electrodes and voltage applied between the electrodes of the ion state modification cell such as to raise the valence to a value where the resultant hydroxide formed is more insoluble.

DESCRIPTION OF A PREFERRED EMBODIMENT

Figure 1:
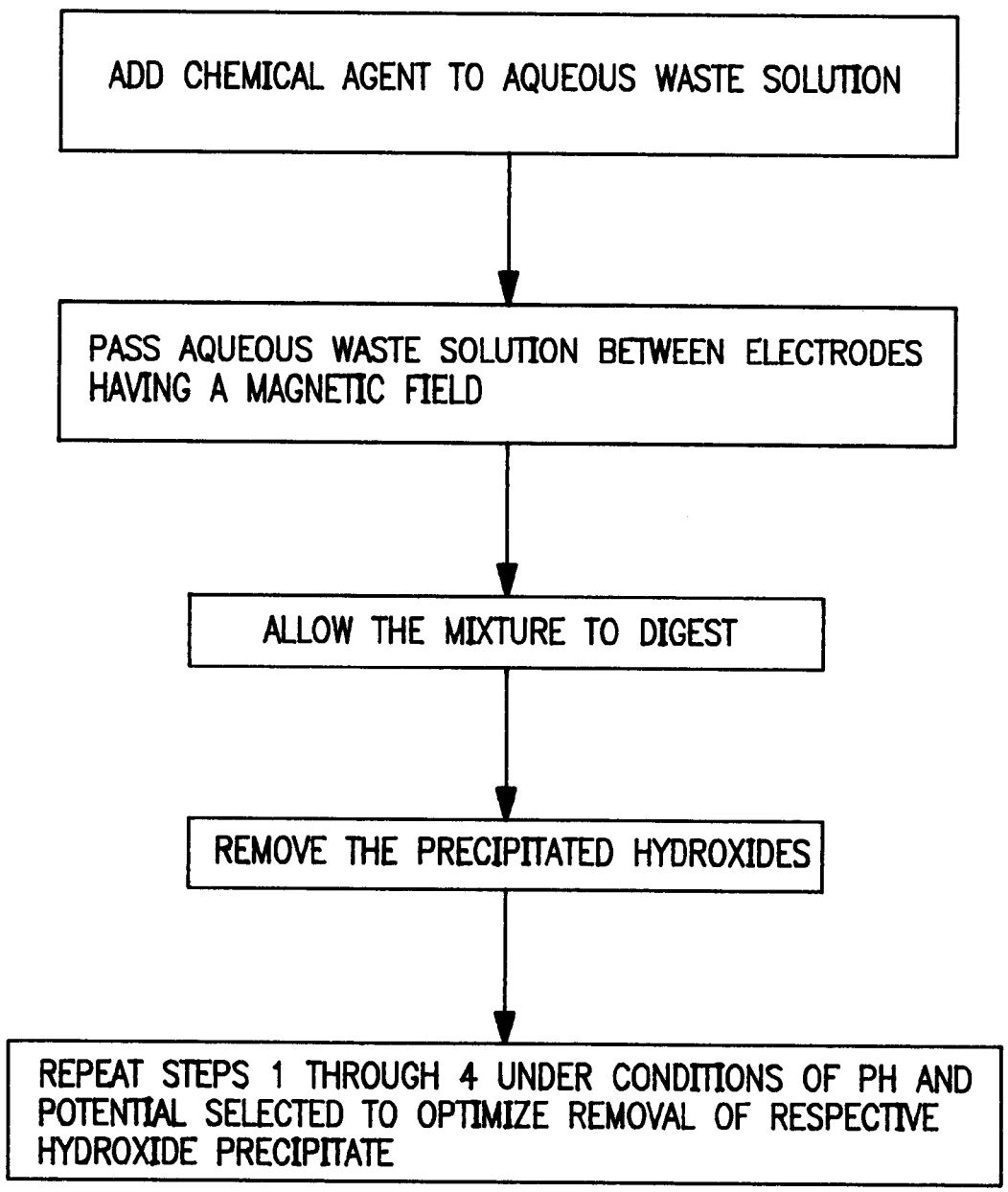
FIG. 1 shows the steps in the process of this invention.

Turning now to a discussion of the drawings, FIG. 1 shows the steps in carrying out the process of this invention for removing contaminating metal ions from aqueous waste solutions, particularly magnesium and calcium from brines.

In step 1, a first chemical agent is added to the aqueous waste water to be purified and mixed in the presence of a magnetic field in a sufficient amount to raise the pH to about 7.5 to about 9.5 depending on the level of calcium contamination. A preferred first agent is prepared according to steps listed in following paragraphs.

In step 2, the mixture is passed serially through at least one "ion state modification" cell. Each cell has a pair of electrodes, across which an electric field is applied. The voltage between the electrodes in each cell is selected to induce change of valency of the ions.

A principle result of step 2 is to cause the precipitation of ions such as Ca having a low ionization potential. Although I do not wish to be bound by theory, it is believed that, in this step, the $Ca^{++}$ is converted to $Ca^{+++}$ by the reaction:

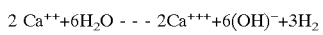

$$2\ Ca^{++} + 6H_2O \mathrm{---} 2Ca^{+++} + 6(OH)^- + 3H_2$$

In step 3, the mixture is allowed to digest so that a sludge of $Ca(OH)_3$ forms.

In step 4, the metal hydroxide sludge (often calcium) is drawn out by settling and/or filtering and the sludge is further dewatered by passage through a filter press. At this point in the process most light metal ions that might have originally been in the waste water have been removed.

In step 5 steps 1 through 4 are repeated. $Mg\ (OH)_2$ is typically used to adjust pH and mixed into the solution, preferably in the presence of a magnetic field. The "ion state modification" cell is operated at 78 to 82 volts where the Mg is oxidized according to the reaction:

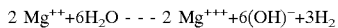

$$2\ Mg^{++} + 6H_2O \mathrm{---} 2\ Mg^{+++} + 6(OH)^- + 3H_2$$

and the $Mg^{+++}$ forms large crystal of insoluble $Mg(OH)_3$ precipitate with most heavy metal ions that might originally have been in the water and which are easily filtered out in the final step.

Figure 2:
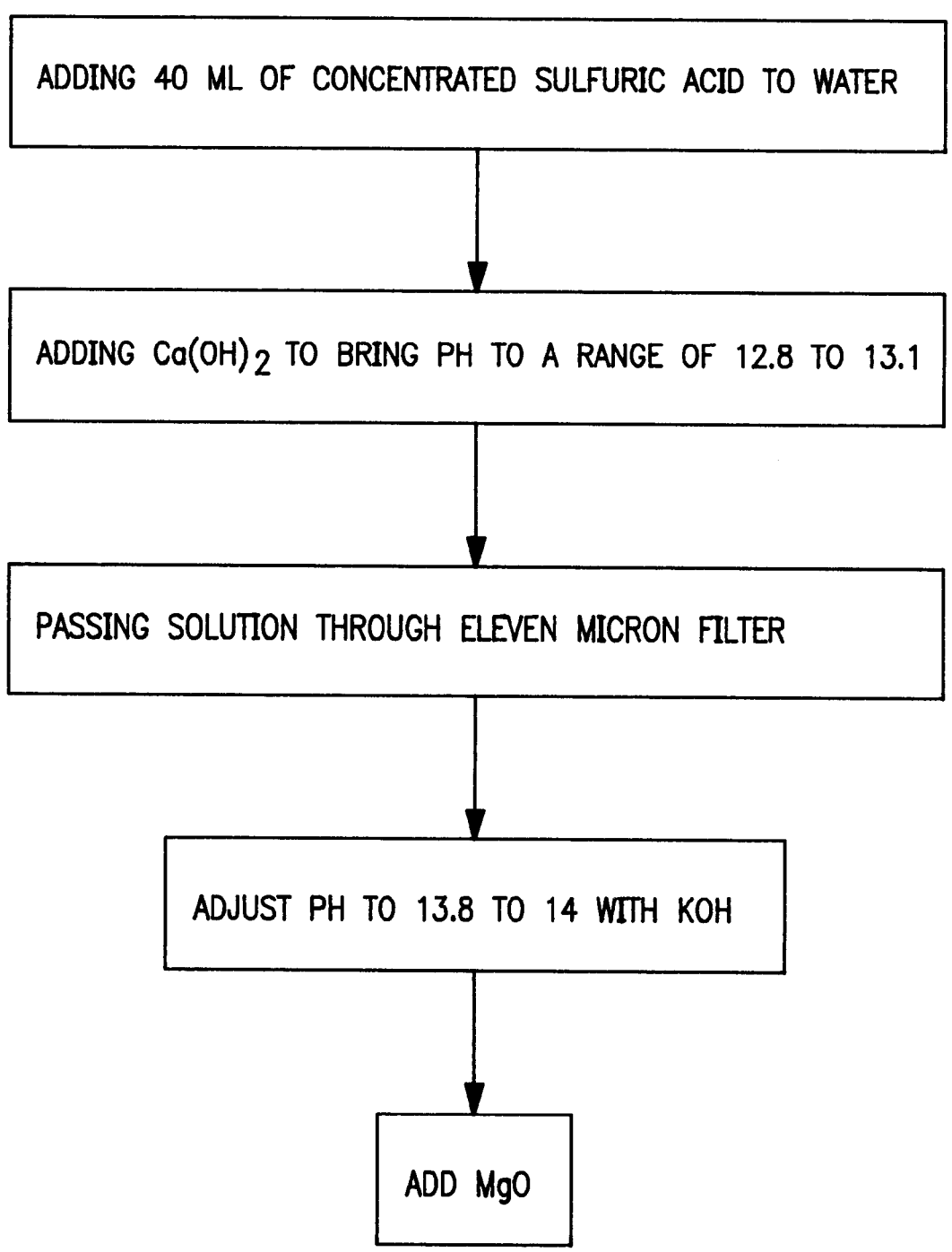
FIG. 2 shows the steps for preparing the first chemical agent.

FIG. 2 shows the steps for preparing the first chemical agent applied in step 1.

In step 1, 40 ml of concentrated sulfuric acid (Be 12°) is added to one liter of water.

In step 2, $Ca(OH)_2$ is added to bring the solution up to a range of 12.1 to 13.1.

In step 3, the solution is passed through an eleven micron filter thereby removing any $CaSO_4$ precipitates larger than eleven microns.

In step 4, sufficient potassium hydroxide is added to bring the pH to a range of 13.8 to 14 thereby producing a base solution.

In step 5, magnesia is added in the amount of 10 grams per one liter of base solution thereby formulating the first chemical agent.

Figure 3:
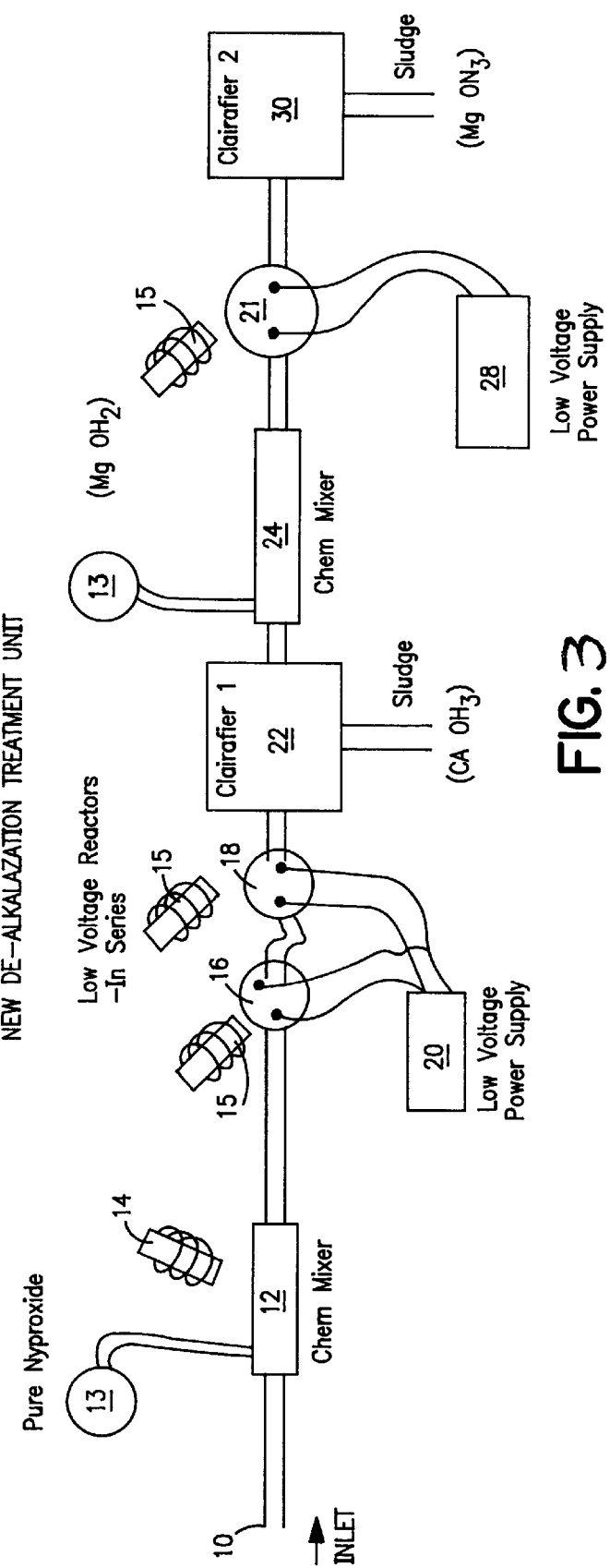
FIG. 3 shows the apparatus for carrying out the invention.

FIG. 3 shows a schematic diagram of the apparatus for performing the steps of the process. There is shown an inlet for discharging the waste water into a chemical mixer 12. In one embodiment, the mixer 12 is subject to a magnetic field provided by a magnet 14. The first chemical agent is admitted to the mixer 12 from reservoir 16. The solution is allowed to digest and is then passed through two series connected "ion state modification cells" 16 and 18. Each cell has a pair of electrodes across which pair a voltage is impressed from power supply 20. The electrodes are preferably tin. The cells are preferably subjected to a magnetic field imposed by externally positioned magnets 15. The calcium and light metal hydroxides precipitate out and these precipitates are removed in the clarifier 22. The solution is then passed to a chemical mixer 24 where it is mixed with $Mg(OH)_2$ from reservoir 26. The solution is then passed through another "ion state modification" cell 27 where $Mg(OH)_3$ is formed. The electrodes of the second stage cell are preferably iron, carbon or titanium. This precipitate is filtered out in the clarifier 30. The power supply 28 for applying power to the "ion state modification" cell 27 is shown.

The process of this invention overcomes a problem encountered in using $Ca(OH)_2$ in state of the art processes to raise the pH to a value high enough to precipitate metal hydroxide precipitates. The problem is that the $Ca(OH)_2$ precipitates thus formed have very low density and consequently poor properties for filtering. U.S. Pat. No. 4,054,516 very plainly shows that the solution of Cu—Zn ions can be removed by adjusting the pH to $9^+$ whereas a five metal mixture Cu—Ni—Pb—Co—Mn ions require a pH above 10.5 to remove the ions. However a solution with a pH above 10.5 requires an excessive amount of acid for reducing the liquid back to 7.0 to 8.0 range required for dumping. The amount of cations added to the waste water for pH reduction may render the water unfit for dumping. The present invention overcomes this problem by converting the $Ca^{++}$ to $Ca^{+++}$ in the first two ion state modification cells as discussed above.

Magnesium hydroxide {$Mg(OH)_2$ is also used for water treatment in state of the art processes. $Mg(OH)_2$ has several advantages in that it is not a toxic metal and it has excellent filtering characteristics in terms of the its coagulant properties. However, this hydroxide is not effective for removing multiple metals primarily because it is self buffering in a pH range of 9.0 to 9.2. The present invention overcomes this problem by converting the $Mg(OH)_2$ to $Mg(OH)_3$ in the third "ion state modification" cell discussed above. With the problem calcium removed, the magnesium ions are converted from $Mg^{++}$ to $Mg^{+++}$ in the ion state modification cell using iron, titanium or carbon electrodes. The $Mg(OH)_3$ is self flocculating and does not require additive chemical flocculating agents for precipitation and filtering.

If the treated solution is to be dumped or disposed of under the Clean Water Act, the pH needs to be reduced to a pH range from 7.0 to 8.2. The pH may be reduced using a strong acid.

EXAMPLE I

A sample of contaminated cooling tower water was obtained from a Mojave Desert industrial site. The contaminants include significant amounts of Cr, Cu, and Zn and as such constitute a toxic hazard that requires treatment as a toxic waste material.

A 650 ml of sample was placed in a stage one reactor (tin anodes) and was treated for two minutes. After the initial treatment, the sample was allowed a digestion time of 2 hours. A 50 ml sub sample was taken from the initial sample and sent to a certified lab for analysis. The remainder was treated in a stage 2 laboratory "ion state modification" cell for an additional one min with no additional digestion time. Total treatment time (including time for digestion) was 2 hr. 4 min. Table I summarizes results of the above procedure:

TABLE I

| (concentrations expressed in ppm at different process stages) | | | | | | |
|---|---|---|---|---|---|---|
| | pH | Ca | Mg | Cr | Cu | Zn |
| Untreated | 6.4 | 140 | 35 | 0.15 | 0.25 | 0.14 |
| Stage 1 + digestion | 8.3 | 6.0 | 24.0 | <0.05 | 0.01 | 0.03 |
| Stage 1 and 2 + digest | 11.6 | 0.05 | 0.1 | <0.05 | <0.01 | 0.03 |
| % metal reduction | | 99.99% | 99.99% | 66% | 96% | 79% |

The results of this process evaluation indicate that the process significantly reduced the levels of alkali earth and heavy metals dissolved in the tested sample to acceptable EPA levels.

EXAMPLE II

A sample of contaminated water was taken from a Mojave desert industrial site. The water from which the sample was obtained was used in steam generation as as well as in a cooling water application. A small amount of HCl had been added as an algicide. The combination of silicates and arsenic together posed a major disposal problem.

A 650 ml sample was placed in a stage 1 cell and was treated for four minutes/ After the initial treatment the sample was allowed to digest for 1 hour. A 50 ml sub sample was taken from the the initial sample and sent to a certified laboratory for analysis. The remainder (approximately 600 ml) was treated in a stage 2 "ion state modification cell" for an additional one minute with no additional digestion time. Total treatment time was therefore 1 hr, 5 min. Table II summarizes the results of the above procedure.

TABLE II

| (concentrations expressed in ppm at different process stages) | | | | | |
|---|---|---|---|---|---|
| | pH | Ca | Mg | As | $SiO_4$ |
| Untreated | 6.5 | 35.0 | 13.0 | 0.22 | 6.3 |
| stage 1 + digest. | 7.6 | 3.9 | 13.0 | <0.14 | 3.8 |
| stage 2 no digest | 7.8 | 2.4 | 0.2 | <.05 | 1.4 |
| % metal reduction | | 93.2% | 98.5 | 78.3 | 88 |
| end stage 3 | | Not detectable | Not detectable | Not detectable | 0.20 |
| end stage 4 | | Not detectable | Not detectable | Not detectable | 0.10 |

The results listed in TABLE II of this process evaluation indicate that the process significantly reduced the levels of alkali earth and heavy metals dissolved in the test sample.

By the addition of a third and fourth treatment cells for the water soluble silicates each having a pair of tin electrodes as discussed above the Arsenic levels were further reduced. (See end stages 3 and 4 in TABLE II.)

Total treatment time for all four stages was 1 hr. 15 min.

EXAMPLE III

A sample of contaminated water was taken from a well on a Northern California industrial site. The site has been in continuous service for over 40 years. The sample was highly alkaline and contained a measurable concentration of several heavy metal contaminants.

A 650 ml sample was placed in a stage one cell and treated for 4 min after which a 25 ml sample was extracted. The sample was allowed a digestion time of 1 hour. A second 25 ml sample was taken. Both extracted samples were sent to a certified lab for analysis. The remainder was placed in a stage 2 laboratory cell and treated for an additional minute with no additional digestion time. Total treatment time (including digestion time ) was 1 hour 5 min. TABLE III summarizes the results of the treatment.

TABLE III (concentrations expressed in ppm at different process stages)

| | pH | Ca | Mg | Mn | Zn |
|---|---|---|---|---|---|
| untreated | 7.8 | 115.0 | 90.0 | 0.02 | 0.26 |
| stage 1 + digestion | 8.8 | 6.8 | 80.0 | 0.01 | 0.09 |
| stage 1 and 2 + digest. | 9.3 | 4.5 | 2.8 | <0.01 | 0.06 |
| % metal reduction | | 97 | 97 | 50 | 77 |

The results of this process evaluation show that the process significantly reduced concentration of low level contaminants as well as larger levels of contaminants. The process does not discriminate against low level contaminants.

EXAMPLE IV

Selenium exhibits multiple valence states −2, +4, +6. The multi valence selenium as a contaminant requires a multi-stage ion state modification cell to deal with the multiple ionic states that are present. The initial treatment is accomplished using two cells. The stage 1 cell leaves residual electrode material in the solution. The stage 2 cell is used to remove the residual stage 1 electrode material from the solution and naturally occurring magnesium. This resulted in a significant reduction of selenium levels. Results of the treatment are presented in TABLE IV.

TABLE IV (concentrations expressed in ppm at different process stages)

| | Selenium Concentration |
|---|---|
| Starting Kesterson Water | 0.015 |
| 2 ea. ion state mod + 1 ea. stage 2 | <<0.01 |

We have found that water with high Ca content is particularly immune to the most rigorous efforts to remove Se unless the Ca is not taken out first. Therefore, an embodiment of this invention includes a preparatory step of removing Ca by any of the procedures discussed above in situations where the presence of Ca requires such a step.

EXAMPLE V

A waste effluent was obtained from a circuit board and electroplating operation in Northern California. The solution was analyzed and the primary constituent was determined to be copper, but in multiple oxidation states. The predominant species was $Cu^{++}$ with lower levels of $Cu^+$.

In order to facilitate electrode maintenance, increase effective plate area and decrease costs, a long ion state modification cell was constructed. The cell was essentially a parallel plate reaction chamber (trough) with iron electrodes which modified the $Cu^+$ oxidation state to $Cu^{++}$ oxidation state. prior to passing the solution through laboratory cell which is more costly and less simple to maintain. The pH was then raised to neutral (7.0±0.5) by the addition of bicarbonate of soda or concenrtrated base solution. The treatment time in the laboratory cell was 15 minutes. During the 15 minute period, considerable precipitate formed. The copper collected during the operation was collected as "metallic copper concentrate" and was commercially marketable as a high grade ore concentrate.

The spent etching solution was analyzed and found to contain 1800 ppm copper. Initial processing modified the $Cu^+$ state to $Cu^{++}$. The pH shift was achieved by the addition of bicarbonate of soda.The concentration was again analyzed and found to contain 1130 ppm copper after which the solution was allowed 1 hr of undisturbed digestion time. An additional drop in copper concentration to 920 ppm was observed. The solution was allowed an additional 1 hr digestion resulting in a further reduction of Cu to 910 ppm. The results are summarized in TABLE VA.

TABLE VA

| | |
|---|---|
| Initial starting concentration | 1800 ppm |
| Conc after trough treatment, filtration and pH normalization | 1130. |
| One hr undisturbed digestion time | 920 |
| Two hr undisturbed digestion time | 910 |

650 ml of this pretreated solution was placed in a stage 1 cell. and subjected to 4 min. treatment. Analysis indicated that Cu concentration had decreased to 300 ppm.

The solution was allowed to digest for one hr and again analyzed. The copper level had decreased further to 120 ppm. The filtrate at this point was high grade copper ore having commercial value.

The remaining solution was then put through a cell having iron electrodes for a period of 1 min. The residue was filtered and sample analyzed. The concentration had dropped to 0.59 ppm. the results are summarized in TABLE VB.

TABLE VB

| | |
|---|---|
| Initial starting concentration | 1800 ppm |
| After open cell pretreatment, no digestion | 1130 |
| After 1 hr undisturbed digestion | 920 |
| After 2 hrs undisturbed digestion | 910 |
| After cell stage 1 4 min | 300 |
| After 1 hr undisturbed digestion | 120 |
| After cell stage 2 1 min | 0.59 |

The residue was a high grade metal hydroxide concentrate.

An important embodiment of this invention is based on our observation that when the ion state of the ions are undergoing modification in the cell (controlled oxidation), the presence of a very strong magnetic field enhances and accelerates the process; The magnetic field is preferably a strong gradient field generated by the presence of the north magnetic pole. To illustrate this effect the following tests are presented.

EXAMPLE VI 650 ml of a well water sample was treated under identical conditions using a cell with and without a magnetic field. Each sample was treated for 2 min under identical conditions in a cell having tin electrodes. The pH was measured before treatment, immediately after treatment and again 1 hr after passive digestion time. The results are tabulated in TABLE VI.

TABLE VI

|  |  | pH starting | pH post treatment | pH after 1 hr digestion |
|---|---|---|---|---|
| Test 1 | No field | 7.7 | 9.2 | 8.6 |
| Test 2 | 9 south | 7.7 | 9.6 | 7.5 |
| Test 3 | 9 north | 7.7 | 8.9 | 8.1 |
| Test 4 | 13 south | 7.7 | 9.8 | 8.6 |

There has been disclosed a method and apparatus for removing contaminating ions from waste water under a wide range of conditions. Variations and modification of the apparatus and methods of the invention may occur after reading the specification and studying the drawings which are within the scope of the invention.

For example, in some situations, it may be more feasible to use a different method for raising the pH other than adding the chemical solution of FIG. 2. Such a method might be to bubble ammonia through the solution.

In another situation, it may be feasible to raise the pH and apply the electro-hydrolysis process in a series of steps by adding the solution of FIG. 2 in steps so as to remove at the lower pH the ion species that would interfere with removal of species at higher pH. As pointed out, Ca is one species that interferes with the removal of other species that precipitate only at higher pH.

In view of these variations, we therefore wish to define the scope of our invention by the appended claims and in view of the specification if need be.

What is claimed is:

1. A method for removing a group of species of metal ions from aqueous solution to be purified wherein at least one species of said group of metal ions has a multiple quantity of ionic states, each state characterized as having its own valence and solubility, said method including the steps in operable order in succession for each species:
   (i) adjusting the pH of said aqueous solution to a value where there is sufficient available hydroxyl ions present to form hydroxides with all ions of each species when all ions of each species is in a highest valency state where said hydroxides are effectively insoluble;
   (ii) passing said aqueous solution between at least one pair of electrodes with a potential between said at least one pair of electrodes selected to convert said each species from a lower valency state to a highest valency state of said respective species whereby said each species forms with said hydroxyl ions a substantially insoluble hydroxide precipitate;
   (iii) holding said aqueous solution from step (ii) in a digesting tank for a period of time sufficient for insoluble precipitates of hydroxides of said respective ion species to form;
   (iv) passing said solution from step (iii) through a means for removing said substantially insoluble precipitates from said aqueous solution.

2. The method of step 1 wherein said step (i) includes a step of adding to said aqueous solution an agent selected to raise said pH.

3. A method for removing a group of species of metal ions from aqueous solution to be purified wherein at least one species of said group of metal ions has a multiple quantity of ionic states, each state characterized as having its own valence and solubility, said method including the steps in operable order in succession for each species:
   (a) adjusting the pH of said aqueous solution to a value between a 7.5 and 9.5 by mixing into the aqueous solution a chemical agent formulated according to the following steps:
      (i) adding 40 ml of concentrated sulfuric acid to each one liter of water;
      (ii) adding $Ca(OH)_2$ to bring the pH of said sulfuric acid up to a range 12.8 to 13.1;
      (iii) passing the aqueous solution of step (ii) through a filter having a pore size no greater than eleven microns;
      (iv) adding sufficient potassium hydroxide to bring the pH of said aqueous solution of step (iii) to a range of 13.8 to 14.0 thereby producing a base solution;
      (v) adding magnesia in an amount of 10 grams per one liter of base solution;
   (b) passing said aqueous solution between at least one pair of electrodes with a potential between said at least one pair of electrodes selected to convert said each species from a lower one of said ionic states to a highest valency state of said ionic states of said respective species whereby said each species forms a substantially insoluble hydroxide precipitate;
   (c) holding said aqueous solution from step (b) in a digesting tank for a period of time sufficient for insoluble precipitates of hydroxides of said respective ion species to form;
   (d) passing said solution from step (c) through a means for removing said substantially insoluble precipitates from said aqueous solution.

4. The method of claim 3 wherein step (b) includes the step of imposing a magnetic field between said electrodes while passing said aqueous solution between said electrodes.

5. The method of claim 3 wherein said group of species of metal ions includes calcium ions and step (b) performed immediately after initially adjusting the pH of said solution to a range between 7.5 and 9.5 includes the step:
   passing said solution between tin electrodes of an ion state modification cell having a voltage between said electrodes in a range between 50.0 to 55.0 volts, whereby $Ca(OH)_3$ precipitates are formed which are removed in step (d).

6. The method of claim 5 wherein said group of species of ions contains at least one of Cr, Cu, Zn, Mn, As, Se and $SiO_2$ ions and said steps following removal of $Ca(OH)_3$ precipitates includes the steps:
   selecting another pair of electrodes from a group of electrodes which consists of carbon, aluminum, iron and titanium;
   imposing a voltage between said another pair of electrodes having a value between said electrodes selected from a range of 79 to 83 volts;
   passing said solution between said another pair of electrodes whereby said at least one of Cr, Cu, Zn, Mn, As and $SiO_2$ ions form substantially insoluble hydroxide precipitates that are removed in step (d).

7. The method of claim 3 wherein said step (d) includes the step of selecting said means for removing to be at least one of a settling tank and a filter press.

* * * * *